United States Patent [19]

Kah, Jr.

[11] 4,353,507
[45] Oct. 12, 1982

[54] SPRINKLER HEAD

[76] Inventor: Carl L. C. Kah, Jr., 778 Lakeside Dr., North Palm Beach, Fla. 33408

[21] Appl. No.: 251,681

[22] Filed: Apr. 6, 1981

Related U.S. Application Data

[62] Division of Ser. No. 69,965, Aug. 27, 1979, Pat. No. 4,272,024.

[51] Int. Cl.³ .............................................. B05B 3/16
[52] U.S. Cl. .................................. 239/240; 137/517; 403/260; 415/147; 415/157
[58] Field of Search ............................ 239/203–206, 239/237, 240–242; 415/147, 157; 138/46, 30; 285/DIG. 22; 403/345, 360; 137/517; 74/606 R, 606 A

[56] References Cited

U.S. PATENT DOCUMENTS

| | | | |
|---|---|---|---|
| 2,095,656 | 10/1937 | Wells | 138/46 X |
| 3,117,724 | 1/1964 | Ray | 239/204 X |
| 3,123,109 | 3/1964 | Bork | 138/30 X |
| 3,846,518 | 11/1974 | McPhee | 285/DIG. 22 X |
| 3,854,664 | 12/1974 | Hunter | 239/240 X |
| 4,026,471 | 5/1977 | Hunter | 239/240 X |
| 4,098,296 | 7/1978 | Grasso et al. | 138/46 X |

*Primary Examiner*—Andres Kashnikow
*Attorney, Agent, or Firm*—Jack N. McCarthy

[57] ABSTRACT

A sprinkler head has a pop-up riser having a nozzle at the upper end thereof for directing a desired flow of fluid therefrom; the riser contains a turbine drive device for rotating the nozzle in response to fluid passing through the sprinkler head; the nozzle having a sealing surface with a part of the sprinkler head; the nozzle being biased against the part so that fluid passing through the nozzle decreases the force biasing the nozzle against the non-rotating part. A modification of the nozzle and turbine drive is disclosed. The modified nozzle is biased against the non-rotating part at a predetermined sealing load which has a minimum effect by the pressure of the fluid flowing through the nozzle. The turbine drive has a gear drive housing filled with fluid and sealed from contact with the fluid passing through the sprinkler head by a capillary tube.

6 Claims, 14 Drawing Figures

SPRINKLER HEAD

This is a division, of application Ser. No. 069,965, filed Aug. 27, 1979, now U.S. Pat. No. 4,272,024.

BACKGROUND OF THE INVENTION

This invention relates to pop-up sprinkler heads and systems in which they are incorporated where water pressure causes the sprinkler head to pop up and to rotate.

Pop-up sprinkler heads are in conventional use today in both commercial and residential water sprinklers. A representation of the prior art is shown by U.S. Pat. No. 3,854,664 and U.S. Pat. No. 4,026,471.

SUMMARY OF THE INVENTION

It is an object of this invention to provide a sprinkler head having a rotating nozzle means for ejecting a fluid under pressure, with said nozzle means having a sealing surface biased against another surface on said sprinkler head, with the fluid flowing through said nozzle means in a direction to decrease the biasing force, allowing the biasing force to be sized to just provide the force necessary for sealing the rotating joint thus minimizing wear on the parts of the rotating joint.

It is another object of this invention to provide a modified sprinkler head having a rotating nozzle means, with said nozzle means having a sealing surface biased against another surface on said sprinkler head whereby the pressure of the fluid flowing through said nozzle means has a minimum effect on the biasing force.

It is a further object of this invention to provide a sprinkler head having a rotating nozzle means where the nozzle means is biased against another surface on said sprinkler head by a spring means.

A further object of the invention is to provide a sprinkler head having a rotating nozzle means wherein the area of sprinkler coverage is controlled by a radially positioned opening means in a nozzle entry disc.

Another object of the invention is to provide a sprinkler head having a rotating nozzle means with gearing for rotating said nozzle means, said gearing being located in a housing surrounded by a liquid. A pressure balance vent is provided between the interior of the housing and the exterior thereof by a capillary tube of predetermined length.

A further object of this invention is to provide a sprinkler head having a rotating nozzle means driven by gearing comprising planetary gear drive units with a small diameter shaft in the center thereof for stacking the planetary gear drive units during the assembly of the gearing.

It is another object of the invention to provide a sprinkler head having a rotating nozzle means driven through gearing by a turbine drive, said turbine drive having a variable flow area stator. For further control, said stator can have a throttleable inlet area.

It is another object of this invention to provide a rotating nozzle means whereby said nozzle means can be easily disassembled for repair or to clean out said nozzle.

It is another object of this invention to provide a sprinkler head having a pop-up riser which includes valve means for preventing flow through said sprinkler head when there is insufficient pressure to open said riser.

Another object of this invention is to provide a rotating nozzle means having a plurality of outlet openings whereby some openings are fed by outer radial openings and others by inner radial openings.

BRIEF DESCRIPTION OF THE DRAWINGS

FIG. 2 is an enlarged view of the turbine and turbine nozzles;

FIG. 3 is a view taken along the line 3—3 of FIG. 2;

FIG. 6 is a view taken along the upper surface of the annular member of the spring means;

DESCRIPTION OF THE PREFERRED EMBODIMENT

Figure 1:
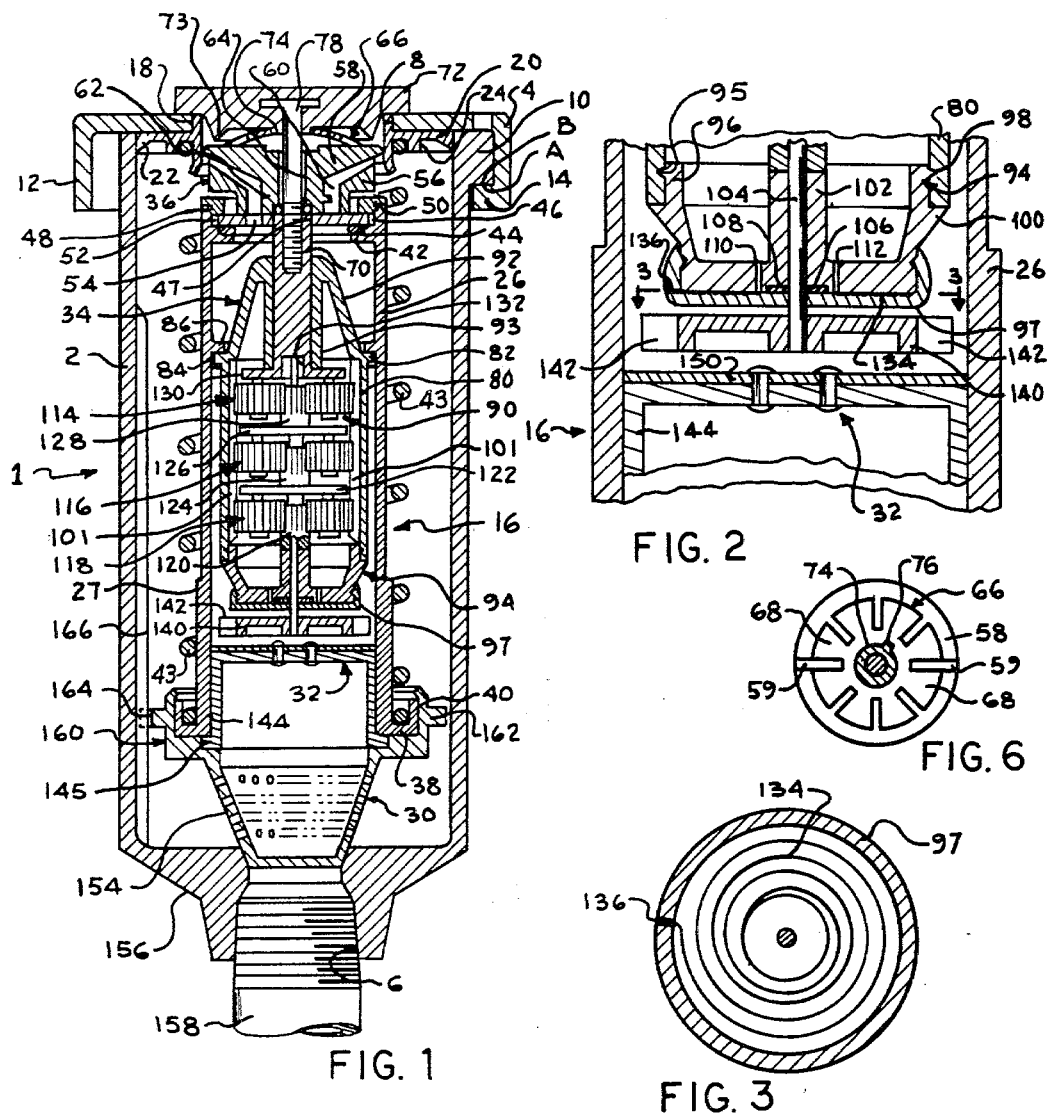
FIG. 1 is an elevational view in section of a sprinkler head showing a modification of my invention.
Figure 4:
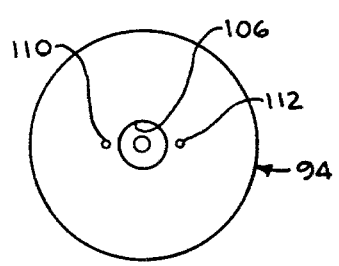
FIG. 4 is a bottom view of the gear drive housing, with the bottom plate removed.

Referring to FIG. 1 of the drawings, a pop-up sprinkler head 1 is shown having a cylindrical housing 2 with a cover 4 on top thereof and an internally threaded opening 6 located at the center of the bottom thereof. Cover 4 is shown fixed to the top of the cylindrical housing 2 and has an opening 8 at the center thereof.

Cover 4 is shown connected to the top of the cylindrical housing 2 by a quick connect-disconnect device which consists of three (3) lugs 10 equally spaced around the outer circumference of the top of the cylindrical housing, while the cover 4 has a downwardly extending flange 12 with three inwardly extending projections 14; the projections 14 being sized to pass between each pair of adjacent lugs 10. The downwardly facing surfaces A of the lugs 10 and the upwardly facing surfaces B of the inwardly extending projections 14 engage each other when the cover 4 is turned in relation to the cylindrical body 2. The surfaces A and B are tapered so that during relative movement, the inside of the flat top of the cover 4 is moved towards the end of the cylindrical housing 2 to provide a sealing engagement.

The cylindrical housing 2 includes a riser member 16 which provides the "pop-up" action of the sprinkler head. The riser 16 is slideably mounted with respect to the cylindrical housing 2 so that it moves between the position shown in FIG. 1 and a position where the riser 16 extends through the opening 8 in the cover 4.

The opening 8 at the center of the cover 4 has a sealing cylindrical member 18 fixed therein which acts as a guide for the riser 16. The bottom of the cylindrical member 18 is flared outwardly to aid in guiding the riser 16 upwardly. The cylindrical member 18 has an annular flange 20 extending outwardly therefrom which engages the underside of the cover 4. The outwardly extending flange 20 has a downwardly extending flange 22 at the end thereof which engages the upper end of the inner periphery of the cylindrical housing 2 to aid in sealing between the cylindrical housing 2 and cover 4. A short cylindrical flange 24 extends downwardly from a center portion of the annular flange 20, providing an upper spring seat with the cylindrical member 18, whose action will be hereinafter described.

The riser 16 comprises four (4) main parts mounted on an inner cylindrical movable housing 26. These parts are (1) a filter and valve device 30; (2) a turbine nozzle means 32; (3) a gear drive 34; and (4) a sprinkler nozzle means 36.

Inner cylindrical housing 26 is formed having an outwardly extending flange 38 at its lower end with the flange 38 having an upwardly extending flange 40 at its outer end forming a lower spring seat which is located in alignment with the upper spring seat formed between cylindrical member 18 and annular flange 24. The inner cylindrical housing 26 has an enlarged thickness 27 at its lower end forming a sealing surface that seals against the flared portion of sealing member 18 when pressure has raised the riser 16 to its operating position. A spring 43, positioned around the riser 16, has one end placed in the lower spring seat and its other end placed in the upper spring seat formed around the cylindrical member 18.

Inner cylindrical housing 26 is formed having a short inwardly extending annular flange 42 located adjacent its upper end to receive an annular seal member 44 and a nozzle entry disc 46. The very top of the inner periphery of the inner cylindrical housing 26 has a groove therearound for receiving an annular raised projection 48 of a snap ring 50. The outer edge of a nozzle entry disc 46 has a plurality of notches for fixedly positioning the nozzle entry disc 46 with respect to the inner cylindrical housing 26. The desired notch on the nozzle entry disc 46 is aligned with and placed over a spline 52 placed on the inner surface of the inner cylindrical housing 26 between the flange 42 and snap ring 50. The nozzle entry disc 46 is formed having a center opening 47 for receiving a drive shaft 70 in a manner to be hereinafter described. The nozzle entry disc 46 also has opening means 54 to permit water to flow to the sprinkler nozzle means 36.

A two-piece nozzle having a lower part 56 and an upper part 58 provides the nozzle function. The lower part 56 is formed like a cylinder with an annular cut-out portion at its bottom which is enclosed by the inner portion of the snap ring 50. The remainder of the bottom of the lower part 56 contacts the nozzle entry disc 46 at the outer edge of the opening means 54. It is biased against said nozzle entry disc 46 through upper part 58 by a spring means to be hereinafter described. An opening extends through the center of said lower part 56 and the top of the lower part extends inwardly to the center as an inverted cone. Ribs 60 extend upwardly along the inner surface of the opening extending along the center part 56 and along the inverted conical surface; said ribs 60 decreasing in height as they extend radially outwardly.

The upper part 58 of the two-piece nozzle is formed having a downwardly extending cylindrical portion 62 whose outer surface engages the inner edge of the ribs 60 and an upper inverted conical portion whose lower surface engages the top of the ribs 60 extending radially outwardly. The top surface of the upper part 58 is flat having two radially extending ribs 59, for a purpose to be hereinafter disclosed, and the outer circumference of the upper part 58 extends radially outward from the outer surface of the lower part 56. This is provided for a cleaning feature to be hereinafter described.

An opening 64 extends down through the center of said upper part 58. The two-piece nozzle comprising lower part 56 and upper part 58 is held against the nozzle entry disc 46 by a spring means comprising an annular member 66 having a plurality of leaf springs 68. The bottom surface of the upper part 58 has a recessed portion therein to receive an O-ring and the upper end of a drive shaft 70 which extends through the center opening of the nozzle entry disc 46. The outer edges of the leaf springs 68 contact the top surface of the upper part 58 with a space between two leaf springs straddling one radially extending rib 59 and a space between two other leaf springs straddling the other radially extending rib 59. It can be seen that this permits up and down spring action, but prevents relative rotation of the annular member 66 and upper part 58.

A top member 72 is formed for closing the opening 8 of cover 4 having an annular projection 74 at the center thereof which engages the center of the annular member 66. A spline 76 projecting from annular projection 74 engages a notch in the opening at the center of annular member 66, thereby preventing relative rotation of the top member 72 and annular member 66. A tapered projection 73 extends downward around the surface of the top member 72 to aid in guiding the seating of the top member 72 against the top of the cover 4. A bolt 78 is fixed to top member 72 and projects downwardly from the center thereof. The bolt 78 is threaded at the end thereof and extends through the opening 64 and engages a threaded opening extending down into the center of drive shaft 70. It can be seen that when the top member 72 is placed together with drive shaft 70, the spring means of the sprinkler nozzle means 36 has its leaf springs 68 biasing the two-piece nozzle downwardly towards the nozzle entry disc 46. The top member 72 can be formed of a plastic with the head of metal bolt 78 embedded therein. While this is one means of construction, any other well known means can be used.

The drive shaft 70 is turned by the gear drive 34. The gear drive 34 has a housing 80 located in the inner cylindrical housing 26 of the riser 16 which has four small projections 82 equally spaced therearound which engage mating grooves 84 in projections 86 around the inner surface of inner cylindrical housing 26. The cooperation of these projections positions the gear drive housing 80 in the riser 16 so that (1) water will flow between the gear drive housing 80 and inner cylindrical housing 26; (2) the gear drive housing 80 will be fixed against rotation with respect to the inner cylindrical housing 26; and (3) an upward stop is provided against which the gear drive housing 80 is biased by the spring means of the sprinkler nozzle means 36.

The housing 80 is formed having a center cylindrical section containing gearing 90. A projection 92 extends upwardly from the center cylindrical section and includes sleeve bearing 93 in which drive shaft 70 is mounted for rotation. The gear drive housing 80 has a removable bottom portion 94 which snaps on the center cylindrical section for permitting access to the interior of the center cylindrical section of housing 80 so that gearing 90 can be inserted therein. A cover plate 97 is snapped (see FIG. 2) over the bottom of the removable bottom portion 94 for a purpose to be hereinafter described.

The inner surface of the center cylindrical section of the housing 80 has a groove 95 therearound adjacent its lower end; the removable bottom portion 94 has a short upstanding cylindrical section 96 with a raised projection 98 around its outer surface, said projection 98 having a snap engagement with the groove 95 in the cylindrical section.

The short upstanding cylindrical section 96 has an outwardly projecting flange 100 which has an upwardly facing annular surface for engaging the bottom of the center cylindrical section of the housing 80. The inner bottom of the removable bottom portion 94 has an upstanding boss 102 standing upwardly in the center thereof through which a small turbine drive shaft 104 passes. A small recess 106 is placed in the outer bottom of the removable bottom portion 94 for receiving an annular seal member 108 for sealing between the removable bottom portion 94 and turbine drive shaft 104.

A passageway 110 extends through the bottom of the removable bottom portion 94, adjacent the upstanding boss 102, to a point adjacent the recess 106; and a passageway 112 extends through the bottom of the removable bottom portion 94, adjacent the other side, to a point on the outer bottom of the removable bottom portion 94. These passageways 110 and 112 are used in a manner to be hereinafter described.

The gearing 90 comprises three planetary drives 114, 116 and 118, for reducing speed of rotation. A drive gear 120 with its lower end placed against the top of the upstanding boss 102 has gear teeth placed adjacent the top thereof with a projection extending upwardly from said gear 120 to engage the planetary drive 118. Planetary drive 118 has three gears mounted and equally spaced around a disc 122 on downwardly extending shafts with enlarged ends for holding the gears on the shafts. Disc 122 engages the projection extending upwardly from gear 120 to properly space the planetary drive 118 while drive gear 120 engages the three gears of planetary drive 118 at the center thereof and an intermediate drive gear 124 extends upwardly from disc 122 to engage the drive 116. The three gears of planetary drive 118 engage toothed splines 101 located around the center cylindrical section of housing 80.

Planetary drive 116 has three gears mounted and equally spaced around a disc 126 on downwardly extending shafts with slightly enlarged ends for holding the gears on the shafts during assembly. Disc 126 engages a projection extending upwardly from intermediate drive gear 124 to properly space the planetary drive 116 while drive gear 124 engages the three gears of planetary drive 116 at the center thereof and an intermediate drive gear 128 extends upwardly from disc 126 to engage the drive 114. The three gears of planetary drive 116 also engage the toothed splines 101.

Planetary drive 114 has three gears mounted and equally spaced around a disc 130 on downwardly extending shafts with slightly enlarged ends for holding the gears on the shafts during assembly. Disc 130 is fixed to the bottom of drive shaft 70. Drive gear 128 engages the three gears of planetary drive 114 at the center thereof. The three gears of planetary drive 114 also engage the toothed splines 101. Small turbine drive shaft 104, which passes through upstanding boss 102, also extends through drive gear 120, disc 122, intermediate drive gear 124, disc 126, and intermediate drive gear 128 into a recess 132 in the bottom of drive shaft 70. This is done to provide for easy assembly of the planetary system and insertion into the gear drive housing 80. Drive gear 120 is fixed on turbine drive shaft 104 to drive the gearing 90.

Cover plate 97, fixed to the removable bottom portion 94, provides a liquid expansion capillary tube to permit a fluid within the housing 80 to expand. A small spiral groove 134 is etched in the surface of cover plate 97 and this groove 134 forms a capillary tube with the outer bottom surface of removable bottom portion 94. Passageway 110, which extends through the bottom of the removable bottom plate 94, is positioned to contact the inner end of the spiral groove 134 which is formed as a circle. The outer end of the small spiral groove 134 contacts an opening 136 in the cover plate 97. The passageway 112 is used to fill the housing 80 with a fluid to aid in the operation of the gearing 90. The spiral groove 134 forms a capillary tube of such a length that oil is not expelled during expansion, or water or air drawn in the gear drive housing 80 during contraction.

The turbine drive shaft 104 extends downwardly through the cover plate 97 and has a turbine rotor 140 fixed to the lower end thereof. It can be seen that rotation of turbine rotor 140 will in turn move the gearing 90, providing a rotation of drive shaft 70 which is at a greatly reduced speed. Turbine rotor 140 has a plurality of rotor blades 142 mounted around an outer circumference.

The turbine nozzle means 32 is positioned in the end of inner cylindrical movable housing 26. Turbine nozzle means 32 comprises a cup-like member 144 which fits into the bottom open end of the inner cylindrical housing 26 and the open end of the cup-like member 144 has an outwardly extending flange 145 which engages the end of the inner cylindrical housing 26 at flange 38. The flat bottom of the cup-like member 144 is spaced from said turbine rotor 140 and has two nozzles 146 and 147 thereon for directing a fluid against the rotor blades 142. Two nozzles 146 and 147 are each formed by an opening 148, each positioned at diametrically opposed points on the outer edges of the flat bottom of the cup-like member 144. The flow through the openings is made variable and directional by a nozzle plate 150 which is riveted to the bottom of cup-like member 144 adjacent the turbine rotor 140. The openings 148 are located approximately under the rotor blades 142. Nozzle plate 150 is formed having two spring fingers 152 located so as to fall, one over each opening 148. It can be seen that as a flow passes through an opening 148, it will press upon a spring finger 152 and open it an amount depending on pressure (water pressure in a lawn sprinkling system); the fact that the finger springs from one end lends direction to the water flow from the openings 148, as indicated by the arrow heads on FIG. 5. In addition to good turbine performance over a wide range of flows, the turbine nozzle means is tolerant to dirt because as dirt is caught between the spring fingers 152 and their openings 148, the spring fingers 152 will simply open further to let the flow and dirt pass through. The variable turbine inlet area thus formed allows the flow to be varied over a wide range of changes in sprinkler nozzle means 36 with a nominal effect on turbine pressure drop when compared to that resulting from a fixed turbine inlet area.

The filter and valve device 30 comprises a conical filter 154 having a solid bottom portion 156. In the position shown in FIG. 1, the solid bottom portion 156 is shown engaging the opening 6 to prevent a flow therethrough until sufficient pressure is applied at the housing inlet opening 6 to overcome the action of spring 43. The threaded portion of opening 6 is shown connected to a conduit 158 which is a fluid inlet. The top portion of the filter and valve device 130 has a compound flange 160 contoured to enclose the outwardly extending flange 145 of cup-like member 144 and flange 38 and upwardly extending flange 40 of the inner cylindrical housing 26. The upper end of this flange is tapered inwardly so that it can be snapped over the cylindrical flange 40. The compound flange 160 also includes a radially extending flange 162 which extends to a point adjacent the inner surface of the cylindrical housing 2. A notch 164 in the radial flange 162 is provided to engage a longitudinally extending spline 166 located along the inner surface of the cylindrical housing 2. This connection provides a guide for the riser 16 and prevents relative rotation between the riser and the cylindrical housing 2.

Figure 11:
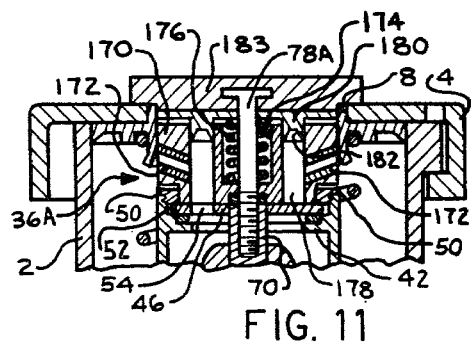
FIG. 11 is a fragmentary view in section of the top of the sprinkler head shown in FIG. 1 showing a modification of the sprinkler nozzle means.

As seen in FIG. 11, the sprinkler head 1 is shown having a modified sprinkler means 36A. The two-piece nozzle of FIG. 1 is replaced by a one-piece nozzle 170 including nozzle inserts 172. The one-piece nozzle 170 is formed cylindrical in shape with an annular cut-out portion at its bottom which encloses the inner portion of the snap ring 50. An opening extends down through the center of the one-piece nozzle 170 for receiving a bolt 78A in the same manner as the two-piece nozzle. The bottom of the one-piece nozzle 170 contacts the nozzle entry disc 46 in the same manner as the two-piece nozzle shown in FIG. 1. A countersunk section 174 is placed coaxially with the opening through the one-piece nozzle 170 for retaining a spring 176. A plurality of longitudinal openings 178 extend around the one-piece nozzle 170 and are aligned with the opening means 54 of the nozzle entry disc 46.

Figure 12:
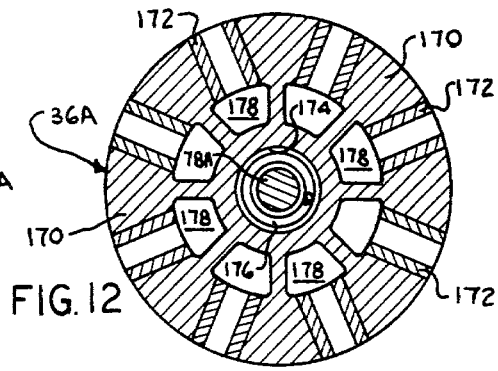
FIG. 12 is an enlarged transverse view taken through FIG. 11 showing the flow passageways from the nozzle entry disc and the nozzle openings leaving the sprinkler nozzle means.

A nozzle insert 172 is fixed in an opening placed between each longitudinal opening 178 and the exterior of the one-piece nozzle 170 (see FIG. 12). The top of the one-piece nozzle 170 has a flat resilient cylindrical member 180 placed thereon with downwardly extending sealing members 182 sealing around the top of each of the longitudinal openings 178. The top member 183 is formed for closing the opening 8 of cover 4 having a flat surface for contacting the top of the flat resilient cylindrical member 180. A bolt 78A is fixed to top member 182 and projects downwardly from the center thereof. The bolt 78A is threaded at the end thereof and extends through an opening at the center of flat resilient cylindrical member 180 and through the opening extending down through the center of the one-piece nozzle 170 where it engages the threaded opening in the center of drive shaft 70.

The threading of bolt 78A into the center of drive shaft 70 compresses the spring 176 in the countersunk section 174. This action biases the bottom of the one-piece nozzle 170 against the nozzle entry disc 46. It can be seen that fluid entering the opening means 54 of the nozzle entry disc 46 will pass into whatever longitudinal opening 178 is located above the opening means 54 and the fluid will pass out through the associated nozzle inserts 172.

Figure 13:
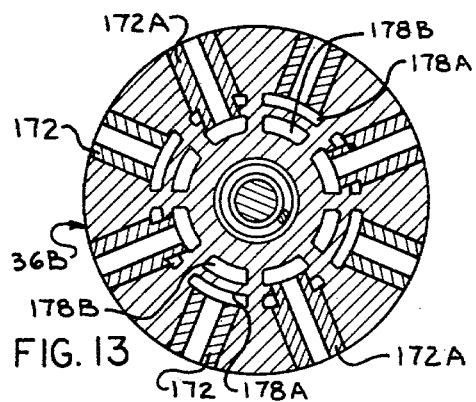
FIG. 13 is a modification of the sprinkler nozzle means shown in FIG. 11 wherein a modified inlet construction is shown having openings located at different radii.
Figure 14:
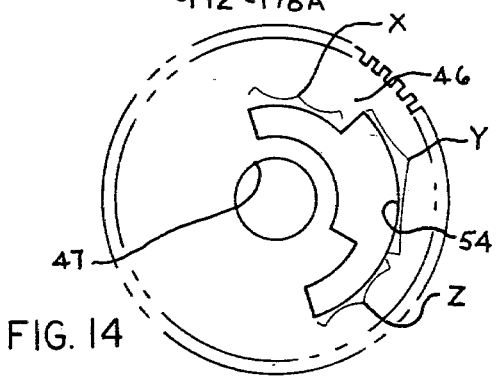
FIG. 14 is an enlarged view of a nozzle entry disc for the modification of the sprinkler nozzle means shown in FIG. 13 whereby separate control is directed to two different radii.

As shown in FIG. 13, a modification of another modified sprinkler means 36B is shown wherein the longitudinal openings 178 are each formed into two openings 178A and 178B, positioned at an outer and inner radius, respectively. The openings 178A are located at the outer portion of the opening 178, while the openings 178B are located at the inner portion of the openings 178. Nozzle inserts 172 are fixed in an opening placed between each longitudinal opening 178A and the exterior of the one-piece nozzle 170, and a nozzle insert 172A is fixed in an opening placed between each longitudinal opening 178A and the exterior of the one-piece nozzle 170 with an extension extending into the longitudinal opening 178B. It can be seen that radial control of flow to the nozzles can be had by the contour of the opening 54 in a nozzle entry disc 46, as shown in FIG. 14. In this nozzle entry disc, one part of the opening means 54, shown by X, will direct a fluid only to the longitudinal openings 178B; a second part of the opening means 54, shown by Y, will direct a fluid to both of the longitudinal openings 178B and 178A; and a third part of the opening means 54, shown by Z, will direct a fluid only to the longitudinal openings 178A. A further control can be had by tailoring specific nozzle inserts for desired individual spray pattern.

Further provision can be made to reduce the effect of the pressure of the fluid flowing through nozzle means 36A or 36B on the biasing means 176 by equalizing pressure above and below the ribs between the openings 178. The upward lifting force of the flow pressure can be minimized on the rotating one-piece nozzle 170 by making the rotating nozzle ribs between openings 178 as thin as possible. The force will then be exerted primarily against the underside of the resilient member 180, including its downwardly extending sealing members 182. Therefore, the spring 176 can be of a force primarily only great enough to insure sealing between rotating nozzle 170 and nozzle entry disc 146. This minimizes wear and required turbine drive torque.

A sprinkler pattern control can be achieved by designing nozzles 172 to have a different distribution characteristic than nozzles 172A. For example, the water stream from smaller diameter nozzles does not travel as far before breaking up due to air shear. Also, a nozzle with a sharp-edged entry causes stream turbulence and breakup sooner than a smooth-edged entry. Further, nozzles can have slits on one side to cause spray fans for a desired coverage pattern.

Figure 5:
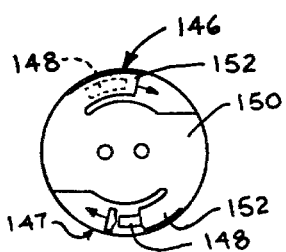
FIG. 5 is a top view of the turbine nozzles.
Figure 7:
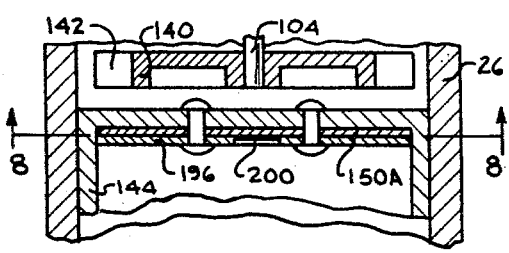
FIG. 7 is an enlarged view of the turbine and a modification of the turbine nozzles.
Figure 8:
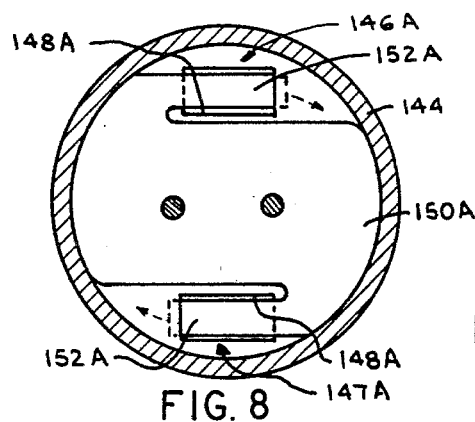
FIG. 8 is a view taken along the line 8—8 of FIG. 7 showing a bottom view of the turbine nozzles.
Figure 9:
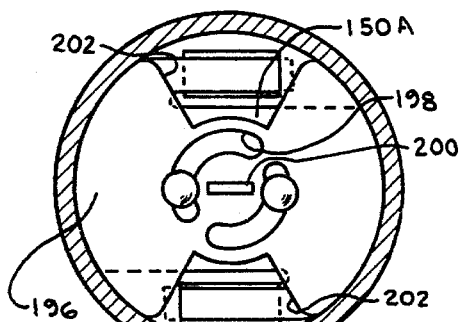
FIG. 9 is a bottom view of the modified turbine nozzles showing an inlet control plate.
Figure 10:
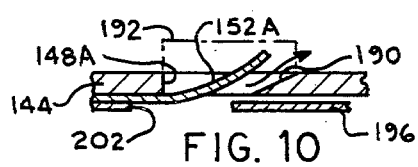
FIG. 10 is a fragmentary view showing a modified turbine nozzle with the inlet control plate moved to partially close the exit end of the nozzle, and with flow opening the cooperating spring finger.

FIGS. 7, 8 and 9 disclose a modification of the turbine nozzles 146A and 147A. These nozzles are positioned in a similar fashion to the nozzles shown in FIG. 5 and have similar openings 148A. However, in FIG. 10 it can be noted that the downstream end of each nozzle opening 148A is formed having a tapered surface 190. Each tapered surface 190 coacts with the free end of its cooperating spring finger 152A, each finger 152A extending through its cooperating nozzle opening 148A from the bottom thereof. In this modification, the nozzle plate 150A is positioned on the inner side of the cup-like member 144, in contrast to FIG. 2 where the nozzle plate 150 is riveted to the bottom of cup-like member 144 adjacent the turbine rotor 140. To prevent a spring finger 152A from engaging a turbine rotor 140, and also aid in directing the fluid, a cover 192 can be placed around an opening 148A, as shown in phantom in FIG. 10. In FIG. 5, a short upstanding flange could extend on each side of a finger 152 from the bottom of member 144 on each side of an opening 148. A movable control plate 196 is positioned over the underside of nozzle plate 150A. This plate is permitted a degree of rotation by having two slots 198 which engage the rivets fixing the nozzle plate 150A in position. It can be seen that the movable control plate 196 can be rotated for a distance permitted by the length of the two slots 198. A recess 200 is formed at the center of the movable control plate 196 to receive a screwdriver, so that the plate can be adjusted to a proper position by a turning movement of the screwdriver. The movable control plate 196 has two cut-out sections 202, which are diametrically opposed and provide for the nozzles 146A and 147A to move without restriction (see FIG. 9). However, as a screwdriver turns, the movable control plate 196 can be moved to throttle the entry to the nozzles 152A, as shown in FIG. 10. This adjustment acts as a throttle for the entire sprinkler flow and allows making an adjustment to the sprinkler pressure to control the sprinkler's maximum coverage. This would be important, for example, when using this improved sprinkler as a replacement in an existing system where line pressure is established to provide coverage for existing types of sprinklers. This type of arrangement could also be used in installing a new system to match sprinkler coverage to a particular layout.

To prevent rotation between the lower part 56 and upper part 58 of the two-piece nozzle shown in FIG. 1, a projection extends radially outward from the cylindrical portion 62 of the upper part 58 between two of the ribs 60 of the lower part 56. Any other known means can be used as desired. Further, bolt 78 bottoms into threads to drive shaft 70 for proper positioning of the top member 72 to permit the upper part 58 and the lower part 56 of the two-piece nozzle to move upwardly against the leaf springs 68 a predetermined distance.

I claim:

1. A sprinkler head having nozzle means for directing fluid therefrom, drive means for rotating said nozzle means in response to fluid passing through said sprinkler head, said drive means including a gear reduction drive, said gear reduction drive being mounted in a housing, a fluid passageway extending around said housing, a pressure balance vent having an extended length being placed in said housing between the interior and the exterior thereof; wherein the bottom of said housing has a first flat surface thereon, a passage extending from the interior of said housing to said first flat surface, a cover having a second flat surface engaging said first flat surface, said cover being connected at the bottom of said housing, a long spiral groove formed in one of said flat surfaces, the inner end of said groove being connected to said passage, the outer end of said groove being connected to a passageway in said cover to the exterior of said housing.

2. A sprinkler head having nozzle means for directing fluid therefrom, drive means for rotating said nozzle means in response to fluid passing through said sprinkler head, said drive means having a turbine rotor, said turbine rotor having turbine blades, turbine nozzle means positioned adjacent said turbine rotor, said turbine nozzle means including openings in line with said turbine blades, spring leaf means covering each opening to provide variable fluid flow area therethrough, wherein said turbine rotor is located in a cylindrical housing, said turbine nozzle means comprising a blocking plate fixed in said cylindrical housing adjacent said turbine rotor, said blocking plate including openings in line with said turbine blades for permitting a flow therethrough to impinge on said blades, a second plate fixed to said blocking plate on the side away from said turbine rotor, said second plate having spring leaf means fixed thereto, each spring leaf means extending through a cooperating opening to provide a variable turbine flow area therethrough.

3. A sprinkler head as set forth in claim 2 wherein a third plate is connected against said second plate, means connecting said third plate so that said third plate can be rotated a predetermined amount in relation to said second plate, said third plate having cut-out sections for cooperating with the openings in said blocking plate for providing a throttleable turbine inlet area.

4. A sprinkler head having nozzle means for directing fluid therefrom, drive means for rotating said nozzle means in response to fluid passing through said sprinkler head, said drive means having a turbine rotor, said turbine rotor having turbine blades, a cylindrical housing surrounding said turbine rotor, turbine nozzle means being positioned adjacent said turbine rotor, said turbine nozzle means comprising a blocking plate fixed in said cylindrical housing adjacent said turbine rotor, said turbine nozzle means including openings around the periphery of the blocking plate in line with said turbine blades, a spring leaf means covering each opening to provide a variable fluid flow area therethrough, a second plate being fixed to said blocking plate, said second plate having a plurality of spring leaf means fixed thereto, each spring leaf means covering a cooperating opening, each spring leaf means extending in a direction around the periphery of the second plate to direct flow from said openings peripherally around said cylindrical housing.

5. A sprinkler head as set forth in claim 4 wherein said openings are arcuate in shape and said cooperating spring leaf means are arcuate in shape.

6. A sprinkler head as set forth in claim 4 wherein said second plate has a plurality of spring leaf means integrally formed around the periphery thereof.

* * * * *